United States Patent Office 3,506,358
Patented Apr. 14, 1970

3,506,358
RAPID SCANNING SPECTROPHOTOMETER OF
DOUBLE BEAM MODE
Hiroaki Baba and Yoshio Shindo, Sapporo-shi, Japan, assignors to The Research Development Corporation of Japan, Minato-ku, Tokyo, Japan
Filed May 14, 1964, Ser. No. 367,459
Claims priority, application Japan, May 17, 1963, 38/26,155
Int. Cl. G01j 3/42
U.S. Cl. 356—88
3 Claims

ABSTRACT OF THE DISCLOSURE

A rapid scanning spectrophotometer of the double beam mode type wherein a photoelectric detector is provided in each of the light paths, a supply voltage for the detector is controlled so that the output of the detector is always at a constant level for all wave lengths, this controlled voltage is also supplied to the detector for the sample to control it, thereby compensating for the variations of the intensity of light from the source, efficiency of the monochromator, sensitivity of the detector and transmission of light for the solvent, the absorption spectrum of the sample is readily indicated on a display device using the output of the detector for the sample.

---

This invention relates to a rapid scanning spectrophotometer of double beam mode of high accuracy which is useful in ultra-violet, visible, near infrared and infrared regions.

Spectrophotometers for directly reading transmittance in ultra-violet, visible, near infrared or infrared regions have been heretofore generally known wherein the absorption spectrum may be displayed on a display device such as, for example, a Braun tube. In order to indicate the very absorption spectrum using such a rapid scanning spectrophotometer, however, the input to the displaying device must be kept at a uniform level independent of wavelength when a sample having uniform transmittance throughout the measurable wavelength range is measured. For this purpose, the level of the output electric signal produced by a detector in the apparatus must be maintained constant irrespective of wavelength by making compensation for differences in intensity of light emitted from a light source, in efficiency of a monochromator and in the sensitivity of light detectors, such as phototubes or photomultipliers, as wavelength varies. But the known rapid scanning spectrophotometers have utilized a single beam mode wherein the above mentioned compensation is not at all exercised or another mode that troublesome compensation is made to the single beam mode using a filter or diaphragm transmitting light in different amounts depending on wavelength.

As a result, the conventional rapid scanning spectrophotometer can not satisfy the requirement that the absorption spectrum be observed immediately after insertion of a sample into the optical path, this being the primary object of the rapid scanning spectrophotometer.

A highly accurate rapid scanning spectrophotometer of the double beam mode type which obviates the above described difficulties in conventional apparatus and which fulfills the primary object of the rapid scanning spectrophotometer is provided according to the invention.

It is the principal object of the present invention to provide an apparatus for rapidly scanning an absorption spectrum of a sample wherein monochromatic light obtained by repeated wavelength scanning of the light radiated by a light source is split into two separate beams which travel respectively along a reference optical path and along a sample optical path, in each of said optical paths is disposed a detector, the sensitivity of the detector disposed in the sample optical path or amplification of an amplifier connected thereto being controlled by the output of the detector disposed in the reference optical path to keep output of the former detector at a constant level throughout the wavelength scanning.

Another object of the present invention is to indicate rapidly an absorption spectrum of a solution wherein compensation is made for the solvent by means of a reference cell in the double beam system.

Another object of the invention is to make automatic compensation for the intensity difference between various wavelengths of light radiated from a light source so that the intensity of the light derived from the source having a uniform spectral intensity may be rapidly determined when the light of an intensity corresponding to that of the light source, for instance, scattered light produced thereby, is to be measured.

One of the features of the invention is to detect variation in intensity of a light source and efficiency of a monochromator to produce electric signals and to effect compensation thereof automatically and accurately using the electric signals.

The present invention will be now described in detail in conjunction with the accompanying drawings which illustrate an embodiment thereof and in which.

Figure 1:
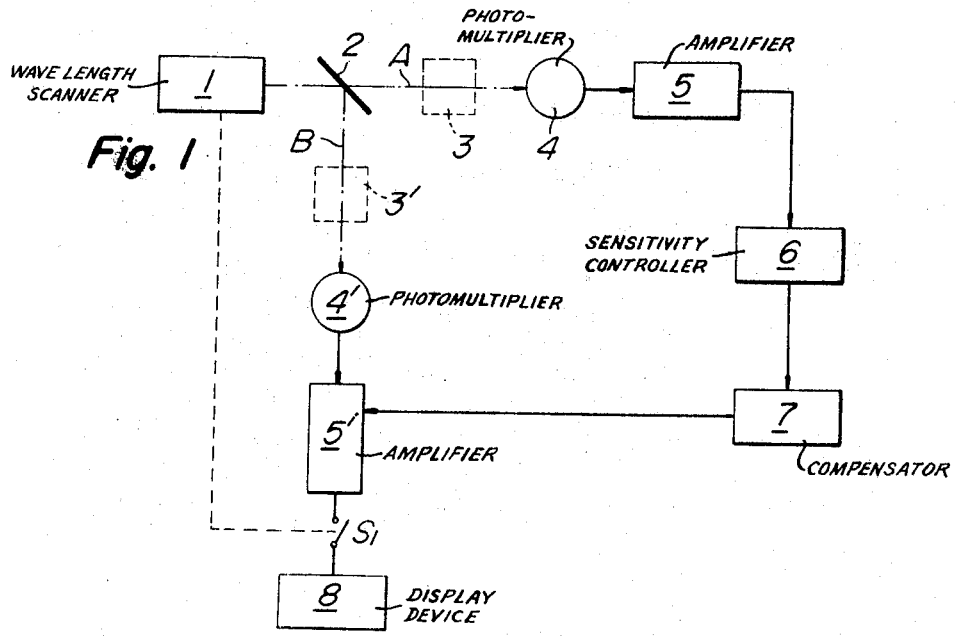
FIG. 1 shows a block diagram of an embodiment of a rapid scanning spectrophotometer of double beam mode according to the present invention.

Referring to FIG. 1, the wavelength of light radiated by a light source is scanned by a wavelength scanning device 1 to obtain monochromatic light. The wavelength scanning operation is carried out repeatedly at a rate of one scanning cycle for less than a second. The monochromatic light thus produced is split into two separate beams respectively travelling along a reference optical path A and along a sample optical path B by means of a double beam forming mirror 2. A reference cell 3 and a detector 4 are disposed in the reference optical path A and the detector 4 is connected through an amplifier 5 and a sensitivity controller 6 to compensator 7 which is provided to compensate for the difference between the spectral sensitivities of photomultipliers 4 and 4'. On the other hand, a sample cell 3' and a detector 4' are disposed in the sample optical path B, and the detector 4' is connected through an amplifier 5' to a display device 8 such as a Braun tube oscillograph to indicate the output of the amplifier 5'. In this connection, amplification of the amplifiers 5' is adapted to be controlled by the output of the compensator 7.

Figure 3:
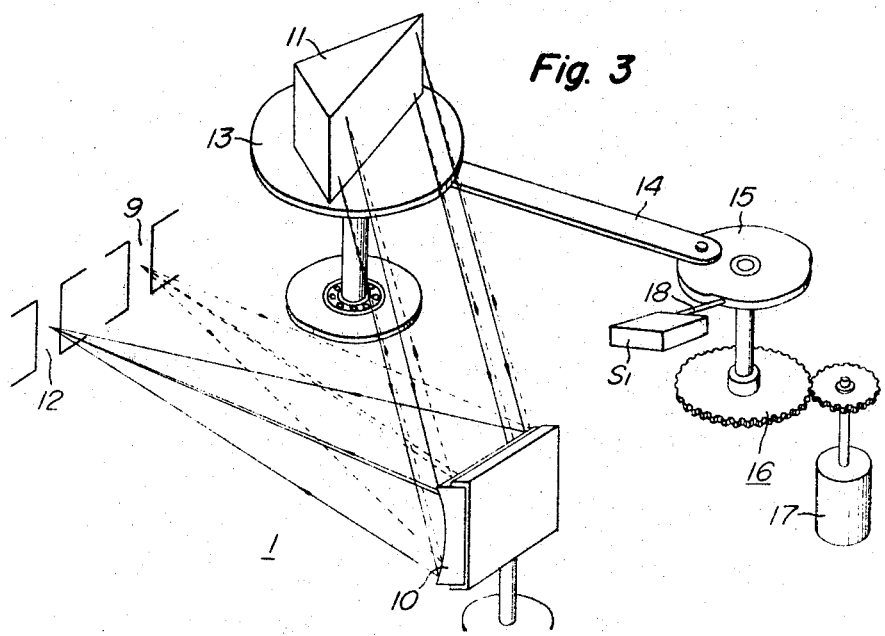
FIG. 3 is a perspective view of a device for scanning wavelength of light emitted by a light source.

In the wavelength scanning device 1 as shown in FIG. 3, light passing through a slit 9 impinges upon a parabolic mirror 10, and the reflected parallel rays of light are dispersed by a prism 11 and return along a substantially parallel path to the mirror 10. The dispersed light is reflected by the mirror 10 to be focussed at an exit slit 12 and after passing through the exit slit 12 it is impinged upon a double beam forming mirror 2 for splitting it into two separate beams. The prism 11 is mounted on a rotating table 13 which is connected through a lever with a rotating disc 15. The rotating disc 15 is connected through a reduction gearing 16 with an electric motor 17. The rotating disc 15 is formed into a cam, the periphery of which is contacted by a contact lever 18 of a switch $S_1$. As the rotating disc 15 rotates, orientation of the prism 11 is changed through the lever 14 to transmit parts of a spectrum, for example, from shorter to longer wavelength of a spectrum, continuously through the exit slit 12. During this operation, the switch $S_1$ is closed, but it is opened when the spectrum is scanned back from the longer wavelength side so that the display device 8 is not fed with a signal. After this, the above mentioned operational cycle is repeated.

With the embodiment of the present invention constructed as described above, monochromatic light obtained by scanning wavelength at a rate of one scanning cycle for less than a second by means of the wavelength scanning device is received by the detector 4 disposed in the reference optical path to detect intensity variation of the light resulting from scanning wavelength, the output of the detector 4 is amplified by the amplifier 5 and fed to the compensator 7 through the sensitivity controller 6 to control automatically amplification of the amplifier 5' disposed in the sample circuit so that compensation is made to amplification in the amplifier 5' for spectral variation of the output of the detector 4'. As a result, if a sample is put into the sample cell 3', the absorption spectrum of the sample is accurately indicated on the display device 8, but only when the switch $S_1$ is closed in the wavelength scanning device 1.

Figure 2:
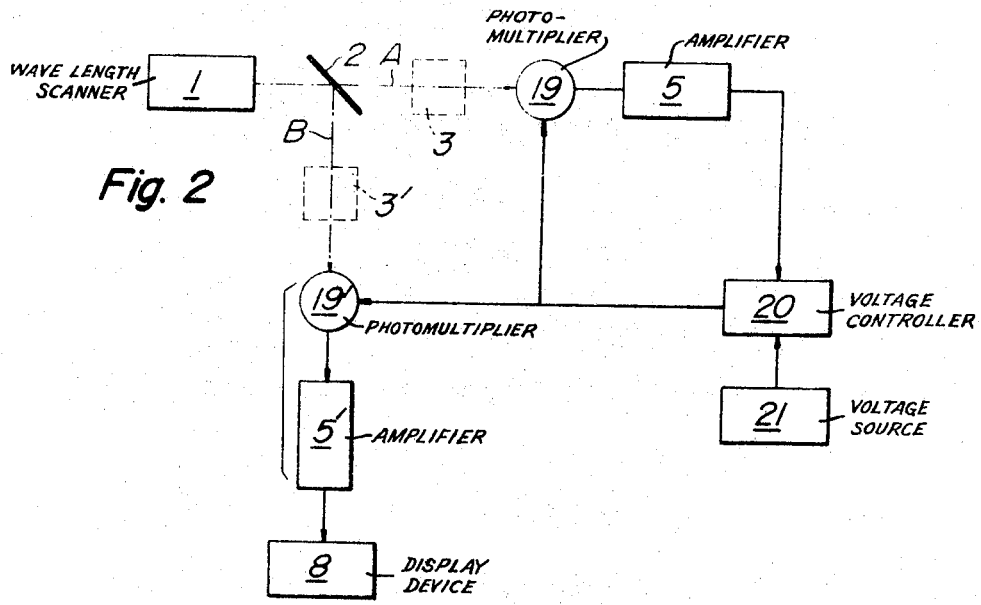
FIG. 2 shows a block diagram of another embodiment of the invention.
Figure 4:
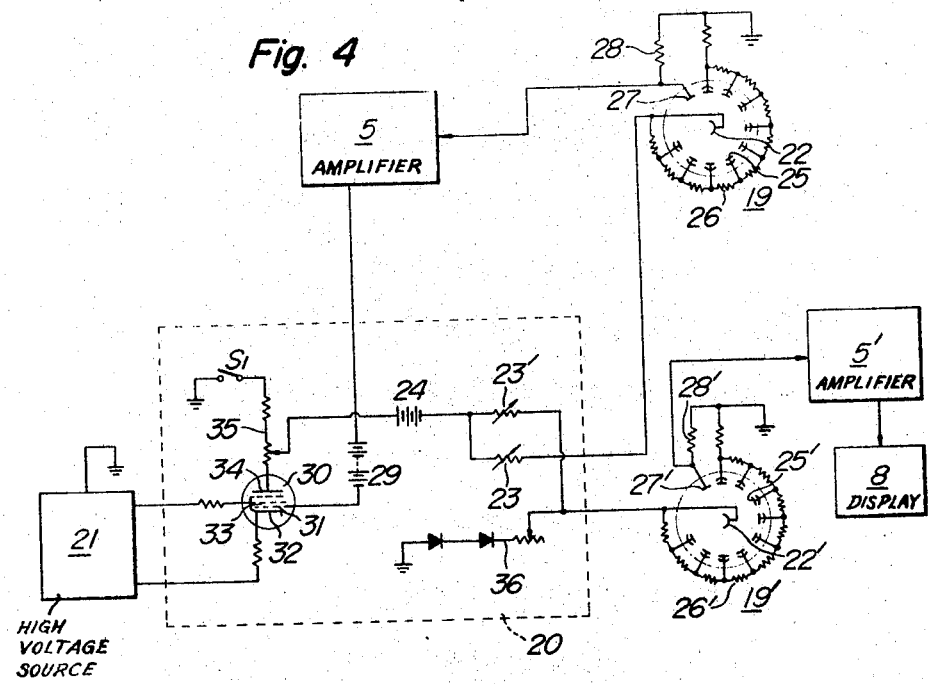
FIG. 4 is a circuit diagram of a voltage controller used in the embodiment shown in FIG. 2.

Referring to FIG. 2, which illustrates another embodiment according to the present invention, monochromatic light from the exit slit of a wavelength scanning device 1, which is illustrated more specifically in FIG. 3, is split into two separate beams by means of a double beam forming mirror 2, as done in the embodiment shown in FIG. 1. One of the beams travels along a reference optical into two separate beams by means of a double beam form- B. There are arranged in the reference optical path A, a reference cell 3 and a detector, such as photomultiplier 19, which is connected through an amplifier 5 to a voltage controller 20. A high voltage source 21 is connected to the voltage controller 20, the output of which is fed to the reference photomultiplier 19 and to a sample photomultiplier 19'. In the sample optical path B are arranged a sample cell 3' and the photomultiplier 19', which is connected through an amplifier 5' to a display device 8 such as a Braun tube to indicate the output of the photomultiplier 19'. A switch $S_1$ is provided between the amplifier 5' and the display device 8 and is interlocked with the scanning device 1. The voltage controller 20 of the photomultipliers 19 and 19' is of such construction as shown in FIG. 4. Thus, cathodes 22, 22' of the reference photomultiplier 19 and the sample photomultiplier 19' are connected to a DC power source 24 through variable resistors 23 and 23', respectively, and dynodes 25 and 25' of the photomultipliers 19 and 19', respectively, are connected electrically to the cathodes 22 and 22' through voltage dividing resistors 26 and 26', respectively. Anodes 27 and 27' of the photomultipliers 19 and 19' are connected to the amplifiers 5 and 5', respectively, while they are grounded through high resistances 28 and 28', respectively. The output of the reference amplifier 5 is connected electrically through a bias voltage source 29 to a control grid 31 of a control tube 30, a cathode 32 and a screen grid 33 of the control tube 30 being connected to the high voltage source 21. Plate 34 of the control tube 30 is grounded through a resistor 35 and a switch $S_1$ which is interlocked with the wavelength scanning device 1.

The intermediate point between the ends of the resistor 35 connected to the plate 34 of the control tube 30 is connected to the positive terminal of the DC voltage source 24 having its negative terminal connected to the cathodes 22 and 22', respectively, and the dynodes 25 and 25' of the photomultipliers 19 and 19' respectively. To the cathode 22' of the photomultiplier 19' is connected a compensating resistor 36 which is a non-linear resistor.

In operation of the described embodiment of the invention, monochromatic light obtained by a single wavelength scanning in the wavelength scanning device 1 is received by the reference photomultiplier 19. The voltage of the DC source 24, which is to control the lowest sensitivity and to improve the control characteristics, and the output voltage of the voltage controller are applied to the respective photomultiplier 19 and 19', and voltage division is adjusted by the variable resistors 23 and 23'. When the intensity of the impinging light on the reference photomultiplier 19 is less than the reference level, the current of the anode 27 decreases and the voltage induced at the high resistor 28 weakens. After being amplified by the amplifier 5, this voltage is applied together with the voltage of a bias voltage source 29 to the control grid 31 of the control tube 30 of the voltage controller. Therefore, when the desired wavelength scanning is begun and the switch $S_1$ is closed, the anode current of the control tube 30 increases, the voltage generated at the added resistor 35 increases and the voltages applied to the respective electrodes of the photomultipliers 19 and 19' become higher resulting in the increase of their sensitivities. On the contrary, when the light of intensity higher than the reference level impinges upon the reference photomultiplier 19, sensitivity of the photomultipliers 19 and 19' is reduced in contrast with the above description. Thus compensation is made automatically to the sensitivity of the photomultipliers 19 and 19' for variation of intensity of light obtained by wavelength scanning and others and, when there is no sample disposed in the sample optical path B, output voltage of the photomultiplier 19' is displayed on the display device 8 through the amplifier 5' as a flat line since current flowing through the high resistance 28' from the anode 27' of the sample photomultiplier 19' is kept unchanged.

When a sample is put into the sample cell 3', the described flat line is transformed into a characteristic absorption spectrum of the sample since absorption is effected at some points on the flat line corresponding to wavelengths characteristic of the sample. This absorption spectrum may be used without any correction as it indicates a result compensated for errors due to wavelength scanning.

If it is desired to observe the absorption spectrum of a solution of a sample, the solvent is put into the reference cell 3 and mixture of the solvent and the sample is put into the sample cell 3' so that absorption spectrum of the sample proper without the solvent may be observed. Such measurement may be similarly made with the embodiment shown in FIG. 1.

If a sample which produces scattered light when irradiated is put into the cell 3' to measure the scattered light, the scattered light compensated for variation of intensity depending upon wavelength of the light source can be indicated on the display device.

What is claimed is:

1. A rapid scanning spectrophotometer of the double beam mode type comprising: a wavelength scanning device for scanning the wavelengths of a source of light repeatedly; means for splitting the light emitted from said wavelength scanning device into two separate continuous beams, one of said beams traveling along a reference optical path and the other of said beams traveling along a sample optical path; a sample cell containing sample material disposed in the sample optical path and a reference cell containing reference material disposed in the reference optical path; a photo-multiplier having a cathode disposed in each optical path beyond the cell therein for receiving light continuously from said sample material and said reference material, respectively; an amplifier connected to each of said photo-multipliers; a high voltage source for providing a supply voltage to both photo-multipliers; a voltage controller responsive to the amplifier in the reference path for comparing the output of the amplifier in the reference path with a predetermined constant voltage maintained therein to continuously control the level of supply voltage from the high voltage source supplied to both photo-multipliers so that the output of the amplifier in the reference optical path is maintained constant throughout said scanning, and means connected solely to the amplifier in said sample path for measuring light values derived from said sample material; wherein said voltage controller comprises a power amplifier tube having a control grid connected directly to the output of the amplifier in said reference optical path by means of a bias voltage source, a cathode and a screen grid connected to said high voltage source and a plate connected to one side of a DC voltage source, the other side of said DC voltage source being connected to the cathodes of said photo-multiplier tubes.

2. A rapid scanning spectrometer as defined in claim 1 further including first and second variable resistors connected between the other side of said DC voltage source and the cathodes of said photo-multiplier tubes, respectively.

3. In a rapid scanning spectrophotometer of the double beam mode type having a sample optical path and a reference optical path and means for projecting a continuous light beam from a single source along each path, the improvement essentially consisting of a photo-multiplier having a cathode and an amplifier connected to the photo-multiplier in each optical path, and a voltage controller for controlling the supply voltage applied to said photo-multipliers comprising a power amplifier tube having a control grid connected directly to the output of the amplifier in the reference optical path by means of a bias voltage source, a cathode and a screen grid connected to a high voltage source and a plate electrode connected to one side of a DC voltage source, the other side of said DC voltage source being connected to both of the cathodes of said photo-multiplier tubes, and means connected solely to the amplifier in said sample optical path for measuring light values derived from sample material therein.

References Cited

UNITED STATES PATENTS 2,565,265    8/1951    Peterson _____ 250—207

RONALD L. WIBERT, Primary Examiner

F. L. EVANS, Assistant Examiner

U.S. Cl. X.R.

250—207; 356—206